(12) United States Patent
Chen et al.

(10) Patent No.: US 9,412,152 B2
(45) Date of Patent: Aug. 9, 2016

(54) IMAGE SHARPENING PROCESSING METHOD AND APPARATUS, AND SHOOTING TERMINAL

(71) Applicant: Huawei Device Co., Ltd., Shenzhen (CN)

(72) Inventors: Gang Chen, Beijing (CN); Wei Luo, Shanghai (CN); Congchao Zhu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/575,710

(22) Filed: Dec. 18, 2014

(65) Prior Publication Data

US 2015/0103214 A1  Apr. 16, 2015

Related U.S. Application Data

(63) Continuation of application No. PCT/CN2013/090947, filed on Dec. 30, 2013.

(30) Foreign Application Priority Data

Jan. 7, 2013  (CN) .......................... 2013 1 0005184

(51) Int. Cl.
*G06T 5/00* (2006.01)
*H04N 5/232* (2006.01)
*H04N 5/217* (2011.01)

(52) U.S. Cl.
CPC ............. *G06T 5/003* (2013.01); *G06T 5/004* (2013.01); *H04N 5/23229* (2013.01); *G06T 2207/20012* (2013.01); *G06T 2207/20192* (2013.01); *H04N 5/217* (2013.01)

(58) Field of Classification Search
None
See application file for complete search history.

(56) References Cited

U.S. PATENT DOCUMENTS 5,081,692 A   1/1992   Kwon et al.
5,867,606 A   2/1999   Tretter
(Continued)

FOREIGN PATENT DOCUMENTS

CN   101197910 A   6/2008
CN   201726464 U   1/2011
(Continued)

OTHER PUBLICATIONS

Kim, S., et al., "Optimal unsharp mask for image sharpening and noise removal," Journal of Electronic Imaging, vol. 14, No. 2, Apr. 2005, 14 pages.
Bressan, M., et al., "Local Contrast Enhancement," Color Imaging XIII: Processing, Hardcopy, and Applications, vol. 6493, Jan. 29, 2007, 12 pages.
(Continued)

*Primary Examiner* — Justin P Misleh
(74) *Attorney, Agent, or Firm* — Conley Rose, P.C.; Grant Rodolph (57) ABSTRACT

An image sharpening processing method and apparatus, and a shooting terminal, where the method includes acquiring to-be-processed image; performing edge-preserving filtering processing on the image to obtain base image information and detail image information, where the base image information includes image edge information; determining, according to the image edge information, a sharpening gain required for performing sharpening processing on the detail image information; and performing sharpening processing on the detail image information using the sharpening gain. It is implemented that the sharpening gain required for sharpening processing is determined by the image edge information, thereby suppressing noise amplification and avoiding generating a phenomenon of overshoot for sharpened image information and improving quality of a sharpened image.

20 Claims, 6 Drawing Sheets

(56) References Cited

U.S. PATENT DOCUMENTS

| | | | | |
|---|---|---|---|---|
| 2004/0041920 | A1* | 3/2004 | Mizukami | H04N 1/603 348/222.1 |
| 2005/0135701 | A1* | 6/2005 | Atkins | G06T 5/002 382/274 |
| 2008/0101716 | A1* | 5/2008 | Ho | G06T 5/004 382/266 |
| 2008/0298712 | A1* | 12/2008 | Kang | G06T 5/004 382/266 |
| 2009/0180707 | A1 | 7/2009 | Li et al. | |
| 2009/0220169 | A1* | 9/2009 | Bennett | G06T 5/20 382/268 |
| 2011/0135217 | A1* | 6/2011 | Su | G06T 5/004 382/261 |
| 2012/0062797 | A1* | 3/2012 | Segall | H04N 5/208 348/606 |
| 2013/0230258 | A1* | 9/2013 | Peng | G06T 5/003 382/254 |
| 2014/0185952 | A1* | 7/2014 | Cabral | G06T 5/004 382/263 |

FOREIGN PATENT DOCUMENTS

| | | |
|---|---|---|
| CN | 101980521 A | 2/2011 |
| CN | 103079038 A | 5/2013 |

OTHER PUBLICATIONS

Jafarpour, S., et al., "Experiments with compressively sampled images and a new debluring-denoising algorithm," Tenth IEEE International Symposium on Multimedia, Dec. 15, 2008, pp. 66-73.
Foreign Communication From a Counterpart Application, European Application No. 13870030.7, Extended European Search Report dated Nov. 2, 2015, 11 pages.
Partial English Translation and Abstract of Chinese Patent Application No. CN101980521A, Jan. 27, 2015, 3 pages.
Partial English Translation and Abstract of Chinese Patent Application No. CN103079038A, Jan. 27, 2015, 3 pages.
Partial English Translation and Abstract of Chinese Patent Application No. CN101197910A, Part 1, Jan. 27, 2015, 5 pages.
Partial English Translation and Abstract of Chinese Patent Application No. CN101197910A, Part 2, Jan. 27, 2015, 3 pages.
Paris, S., et al., "A Fast Approximation of the Bilateral Filter using a Signal Processing Approach," International Journal of Computer Vision, vol. 81, No. 1, Jan. 2009, 12 pages.
Porikli, F., et al., "Constant Time O(1) Bilateral Filtering," Conference on Computer Vision and Pattern Recognition, Jun. 23-28, 2008, 8 pages.
Foreign Communication Form a Counterpart Application, PCT Application No. PCT/CN2013/090947, English Translation of International Search Report dated Mar. 20, 2014, 2 pages.
Foreign Communication Form a Counterpart Application, PCT Application No. PCT/CN2013/090947, Written Opinion dated Mar. 20, 2014, 6 pages.

* cited by examiner

IMAGE SHARPENING PROCESSING METHOD AND APPARATUS, AND SHOOTING TERMINAL

CROSS-REFERENCE TO RELATED APPLICATIONS

This application is a continuation of International Application No. PCT/CN2013/090947, filed on Dec. 30, 2013, which claims priority to Chinese Patent Application No. 201310005184.6, filed on Jan. 7, 2013, both of which are hereby incorporated by reference in their entireties.

TECHNICAL FIELD

Embodiments of the present invention relates to image processing technologies, and in particular, to an image sharpening processing method and apparatus, and a shooting terminal.

BACKGROUND

Due to a restriction on hardware aspects, such as a lens, an aperture and a sensor, there is a relatively large gap between quality of an image shot by a mobile phone and an image shot by a digital camera, and an image shot by a mobile phone has a relatively low definition. For a cost reason, on a basis that a hardware condition is not improved, image definition can be improved through image sharpening processing.

In the prior art, an image shot is decomposed into a low-frequency base image and a high-frequency detail image using a high-pass filter or a low-pass filter. Because the high-frequency detail image information determines a definition of the image, multiplication is performed on the high-frequency detail image information and a sharpening gain to obtain enhanced detail image information. Then, addition is performed on the base image information and the enhanced detail image information to obtain a sharpened image, thereby improving image definition.

In a process of implementing the present invention, the inventor finds that in the prior art, a phenomenon of overshoot and noise amplification may occur in a sharpened image, thereby causing low image quality.

SUMMARY

The present invention provides an image sharpening processing method and apparatus, and a shooting terminal to suppress noise amplification and avoid generating a phenomenon of overshoot for sharpened image information, improving quality of the sharpened image.

According to a first aspect, an embodiment of the present invention provides an image sharpening processing method, including acquiring to-be-processed image information; performing edge-preserving filtering processing on the image information to obtain base image information and detail image information, where the base image information includes image edge information; determining, according to the image edge information, a sharpening gain required for performing sharpening processing on the detail image information; and performing sharpening processing on the detail image information using the sharpening gain.

In a first possible implementation manner of the first aspect, before the determining, according to the image edge information, a sharpening gain required for performing sharpening processing on the detail image information, the method further includes performing edge detection processing on the base image information to obtain the image edge information.

With reference to the first aspect or the first possible implementation manner of the first aspect, in a second possible implementation manner of the first aspect, the performing edge-preserving filtering processing on the image information to obtain base image information and detail image information includes performing edge-preserving filtering processing on the image information using an edge-preserving filter to obtain the base image information; and subtracting the base image information from the image information to acquire the detail image information.

With reference to the first aspect, the first possible implementation manner of the first aspect, or the second possible implementation manner of the first aspect, in a third possible implementation manner of the first aspect, the determining, according to the image edge information, a sharpening gain required for performing sharpening processing on the detail image information includes determining, according to the image edge information and metadata of the image information, the sharpening gain required for performing sharpening processing on the detail image information.

With reference to the third possible implementation manner of the first aspect, in a fourth possible implementation manner of the first aspect, the determining, according to the image edge information and metadata of the image information, the sharpening gain required for performing sharpening processing on the detail image information includes determining a sharpness algorithm parameter group according to light sensitivity and exposure time of the image information, where the sharpness algorithm parameter group includes a maximum value of the sharpening gain of the image information, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of the maximum value and the minimum value, where the first amplitude is less than the second amplitude; and determining, according to the image edge information and sharpness algorithm parameter group, the sharpening gain required for performing sharpening processing on the detail image information.

With reference to the fourth possible implementation manner of the first aspect, in a fifth possible implementation manner of the first aspect, the determining, according to the image edge information and the sharpness algorithm parameter group, the sharpening gain required for performing sharpening processing on the detail image information includes performing calculation using formula (1) to acquire the sharpening gain Sharpmap:

$$Sharpmap = \frac{(Peak - Low)(edgInfo)^{2 \times order1}}{(cutoff1)^{2 \times order1} + (edgInfo)^{2 \times order1}} \times \frac{(cutoff2)^{2 \times order2}}{(cutoff2)^{2 \times order2} + (edgInfo)^{2 \times order2}} + Low, \quad (1)$$

where edgInfo is the amplitude of the image edge information, Peak is the maximum value of the sharpening gain, Low is the minimum value of the sharpening gain, order1 is the first gradient of the sharpening gain increasing from the minimum value to the maximum value along with the increase of the amplitude, order2 is the second gradient of the sharpening gain decreasing from the maximum value to the minimum value along with the increase of the amplitude, Cutoff1 is the first amplitude of the image edge information when the sharpening gain is half of the maximum value and the minimum value, and Cutoff2 is the second amplitude of the image edge information when the sharpening gain is half of the maximum value and the minimum value.

With reference to the fourth possible implementation manner of the first aspect or the fifth possible implementation manner of the first aspect, in a sixth possible implementation manner of the first aspect, before the determining a sharpness algorithm parameter group according to light sensitivity and exposure time of the image information, the method further includes determining a correspondence between the light sensitivity and the exposure time of the image information and the sharpness algorithm parameter group.

With reference to the sixth possible implementation manner of the first aspect, in a seventh possible implementation manner of the first aspect, the determining a correspondence between the light sensitivity and the exposure time of the image information and the sharpness algorithm parameter group includes acquiring at least one to-be-processed image information and metadata of the image information, where the metadata includes light sensitivity and exposure time; performing edge-preserving filtering processing on the image information using an edge-preserving filter to obtain base image information, where the base image information includes image edge information; subtracting the base image information from the image information to acquire the detail image information; performing edge detection processing on the base image information to obtain the image edge information; adjusting the sharpness algorithm parameter group to obtain at least one sharpness algorithm parameter group; performing calculation using formula (1) to acquire a sharpening gain Sharpmap:

$$Sharpmap = \frac{(Peak - Low)(edgInfo)^{2 \times order1}}{(cutoff1)^{2 \times order1} + (edgInfo)^{2 \times order1}} \times \frac{(cutoff2)^{2 \times order2}}{(cutoff2)^{2 \times order2} + (edgInfo)^{2 \times order2}} + Low, \quad (1)$$

where edgInfo is an amplitude of the image edge information, Peak is a maximum value of the sharpening gain, Low is a minimum value of the sharpening gain, order1 is a first gradient of the sharpening gain increasing from the minimum value to the maximum value along with an increase of an amplitude, order2 is a second gradient of the sharpening gain decreasing from the maximum value to the minimum value along with the increase of the amplitude, Cutoff1 is a first amplitude of the image edge information when the sharpening gain is half of the maximum value and the minimum value, and Cutoff2 is a second amplitude of the image edge information when the sharpening gain is half of the maximum value and the minimum value; performing sharpening processing on the detail image information using the sharpening gain; performing summation on the base image information and the sharpened detail image information to acquire the sharpened image information; when definition of the sharpened image reaches a preset value, determining a sharpness algorithm parameter group corresponding to the light sensitivity and the exposure time of the image information; and acquiring the correspondence between the light sensitivity and the exposure time of the image information and the sharpness algorithm parameter group using a Gaussian process and according to the light sensitivity and the exposure time of the at least one image information and the corresponding sharpness algorithm parameter group.

According to a second aspect, an embodiment of the present invention provides an image sharpening processing apparatus, including an acquiring module configured to acquire to-be-processed image information, and perform edge-preserving filtering processing on the image information to obtain base image information and detail image information, where the base image information includes image edge information; a gain determining module configured to determine, according to the image edge information, a sharpening gain required for performing sharpening processing on the detail image information; and a sharpening processing module configured to perform sharpening processing on the detail image information using the sharpening gain.

In a first possible implementation manner of the second aspect, the acquiring module is further configured to, before the gain determining module determines, according to the image edge information, a sharpening gain required for performing sharpening processing on the detail image information, perform edge detection processing on the base image information to obtain the image edge information.

With reference to the second aspect or the first possible implementation manner of the second aspect, in a second possible implementation manner, the acquiring module is configured to perform edge-preserving filtering processing on the image information using an edge-preserving filter to acquire the base image information; and subtract the base image information from the image information to obtain the detail image information.

With reference to the second aspect, the first possible implementation manner of the second aspect, or the second possible implementation manner of the second aspect, in a third possible implementation manner of the second aspect, the gain determining module is configured to determine, according to the image edge information and metadata of the image information, the sharpening gain required for performing sharpening processing on the detail image information.

With reference to the third possible implementation manner of the second aspect, in a fourth possible implementation manner of the second aspect, the gain determining module is configured to determine a sharpness algorithm parameter group according to light sensitivity and exposure time of the image information, where the sharpness algorithm parameter group includes a maximum value of the sharpening gain of the image information, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of the maximum value and the minimum value, where the first amplitude is less than the second amplitude; and determine, according to the image edge information and the sharpness algorithm parameter group, the sharpening gain required for performing sharpening processing on the detail image information.

With reference to the fourth possible implementation manner of the second aspect, in a fifth possible implementation manner of the second aspect, the gain determining module is configured to perform calculation using formula (1) to acquire a sharpening gain Sharpmap:

$$Sharpmap = \frac{(\text{Peak} - \text{Low})(edgInfo)^{2 \times order1}}{(cutoff1)^{2 \times order1} + (edgInfo)^{2 \times order1}} \times \frac{(cutoff2)^{2 \times order2}}{(cutoff2)^{2 \times order2} + (edgInfo)^{2 \times order2}} + \text{Low}, \quad (1)$$

where edgInfo is the amplitude of the image edge information, Peak is the maximum value of the sharpening gain, Low is the minimum value of the sharpening gain, order1 is the first gradient of the sharpening gain increasing from the minimum value to the maximum value along with the increase of the amplitude, order2 is the second gradient of the sharpening gain decreasing from the maximum value to the minimum value along with the increase of the amplitude, Cutoff1 is the first amplitude of the image edge information when the sharpening gain is half of the maximum value and the minimum value, and Cutoff2 is the second amplitude of the image edge information when the sharpening gain is half of the maximum value and the minimum value.

With reference to the fourth possible implementation manner of the second aspect or fifth possible implementation manner of the second aspect, in a seventh possible implementation manner of the second aspect, the method further includes a correspondence determining module configured to determine the correspondence between the light sensitivity and the exposure time of the image information and the sharpness algorithm parameter group before the gain determining module determines the sharpness algorithm parameter group according to the light sensitivity and the exposure time of the image information.

With reference to the sixth possible implementation manner of the second aspect, in a seventh possible implementation manner of the second aspect, the correspondence determining module includes a first acquiring unit configured to acquire at least one to-be-processed image information and metadata of the image information, where the metadata includes light sensitivity and exposure time; a second acquiring unit configured to perform edge-preserving filtering processing on the image information using an edge-preserving filter to obtain base image information, where the base image information includes image edge information; subtract the base image information from the image information to acquire the detail image information; and perform edge detection processing on the base image information to obtain the image edge information; a third acquiring unit configured to adjust the sharpness algorithm parameter group to obtain at least one sharpness algorithm parameter group; and perform calculation using formula (1) to acquire a sharpening gain Sharpmap:

$$Sharpmap = \frac{(\text{Peak} - \text{Low})(edgInfo)^{2 \times order1}}{(cutoff1)^{2 \times order1} + (edgInfo)^{2 \times order1}} \times \frac{(cutoff2)^{2 \times order2}}{(cutoff2)^{2 \times order2} + (edgInfo)^{2 \times order2}} + \text{Low}, \quad (1)$$

where edgInfo is an amplitude of the image edge information, Peak is a maximum value of the sharpening gain, Low is a minimum value of the sharpening gain, order1 is a first gradient of the sharpening gain increasing from the minimum value to the maximum value along with an increase of an amplitude, order2 is a second gradient of the sharpening gain decreasing from the maximum value to the minimum value along with the increase of the amplitude, Cutoff1 is a first amplitude of the image edge information when the sharpening gain is half of the maximum value and the minimum value, and Cutoff2 is a second amplitude of the image edge information when the sharpening gain is half of the maximum value and the minimum value; a sharpening unit configured to perform sharpening processing on the detail image information using the sharpening gain; a determining unit configured to perform summation on the base image information and the sharpened detail image information to acquire the sharpened image information; and when definition of the sharpened image reaches a preset value, determine a sharpness algorithm parameter group corresponding to the light sensitivity and the exposure time of the image information; a correspondence establishing unit configured to acquire the correspondence between the light sensitivity and the exposure time of the image information and the sharpness algorithm parameter group using a Gaussian process and according to the light sensitivity and the exposure time of the at least one image information and the corresponding sharpness algorithm parameter group.

According to a third aspect, an embodiment of the present invention further provides a shooting terminal, including the image sharpening processing apparatus described above.

In a first possible implementation manner of the third aspect, the shooting terminal includes a mobile phone or a tablet computer.

Using the image sharpening processing method and apparatus, and the shooting terminal provided in the embodiments of the present invention, edge-preserving filtering processing is performed on an image, so that image edge information can be preserved in base image information and further that a sharpening gain required for performing sharpening processing on the detail image information is determined according to the image edge information. Therefore, in a process of performing sharpening processing on the detail image information using the sharpening gain, noise amplification is suppressed and a phenomenon of overshoot is avoided for sharpened image information, thereby improving quality of an sharpened image.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
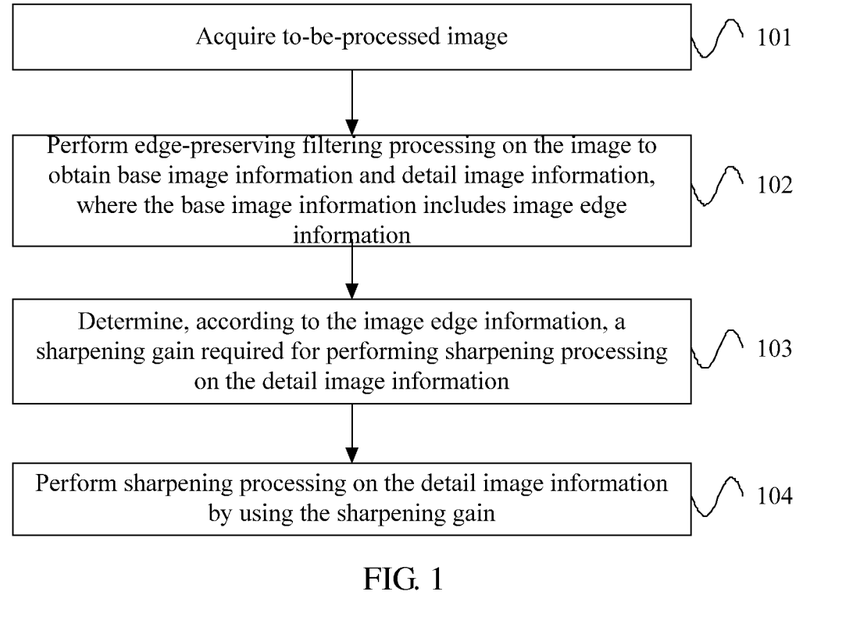
FIG. 1 is a flowchart of a first embodiment of an image sharpening processing method according to the present invention.

FIG. 1 is a flowchart of a first embodiment of an image sharpening processing method according to the present invention. As shown in FIG. 1, this embodiment can be implemented using an image sharpening processing apparatus, and the apparatus, may be integrated into a shooting terminal to implement the method in this embodiment. The method in this embodiment may include the following steps.

Step 101: Acquire to-be-processed image information.

In this embodiment, the to-be-processed image information is acquired. The to-be-processed image information may be image information that is not processed using an image processing algorithm, for example, may be image information shot by a shooting terminal, where the shooting terminal may be a device having a shooting lens, such as a mobile phone, a tablet computer (PAD), a notebook computer or a multi-functional player. Due to a restriction on a hardware condition of these shooting terminals, quality of shot image information is relatively poor. Therefore, the image information needs to be processed.

Step 102: Perform edge-preserving filtering processing on the image information to obtain base image information and detail image information, where the base image information includes image edge information.

In this embodiment, edge-preserving filtering processing is performed on the to-be-processed image information. The image to be processed may be decomposed into base image information and detail image information, where the base image information may be low-frequency image information, the detail image information may be high-frequency image information, and the obtained base image information includes image edge information. It should be noted that, edge-preserving filtering processing performed on the image information is consistent with that in the prior art, and details are not repeatedly described herein in this embodiment.

Step 103: Determine, according to the image edge information, a sharpening gain required for performing sharpening processing on the detail image information.

In this embodiment, the sharpening gain required for performing sharpening processing on the detail image information may be determined according to the image edge information, in the base image information, that is obtained after preserving filtering. When edge-preserving filtering processing is performed on the to-be-processed image information, the image edge information is retained in the low-frequency base image information, and noise in the to-be-processed image information is retained in the high-frequency detail image information. Therefore, the image edge information and the noise can be separated, and the image edge information is not interfered by the noise, and the image edge information obtained in this way has a relatively good amplitude. If the amplitude in the image edge information is excessively low, it indicates that the image information has little edge information, and it is a flat area in the image, and there is a high possibility that noise exists in the flat area. Therefore, to suppress noise amplification, the sharpening gain required for performing sharpening processing on the detail image information should be less. If the amplitude in the image edge information is excessively high, it indicates that the image information has much edge information, and to avoid generating a phenomenon of overshoot, the sharpening gain required for performing sharpening processing on the detail image information should be less. If the amplitude in the image edge information is in the middle of a value range, an appropriate sharpening gain can be selected according to an actual application scenario to performing sharpening processing on the detail image information.

Step 104: Perform sharpening processing on the detail image information using the sharpening gain.

In this embodiment, sharpening processing is performed on the detail image information using the sharpening gain determined according to image edge information to obtain the sharpened detail image information. It should be noted that, sharpening processing performed on the detail image information using the sharpening gain is consistent with that in the prior art, and details are not repeatedly described herein in this embodiment. Further, summation is performed on the base image information and the sharpened detail image information, that is, synthesis is performed on the base image information and the sharpened detail image information to obtain the sharpened image information.

Using the image sharpening processing method provided in the first embodiment of the present invention, edge-preserving filtering processing is performed on image information, so that image edge information can be preserved in base image information and further that a sharpening gain required for performing sharpening processing on detail image information is determined according to the image edge information. Therefore, in a process of performing sharpening processing on the detail image information using the sharpening gain, noise amplification is suppressed and a phenomenon of overshoot is avoided for the sharpened image information, thereby improving quality of a sharpened image.

Figure 2:
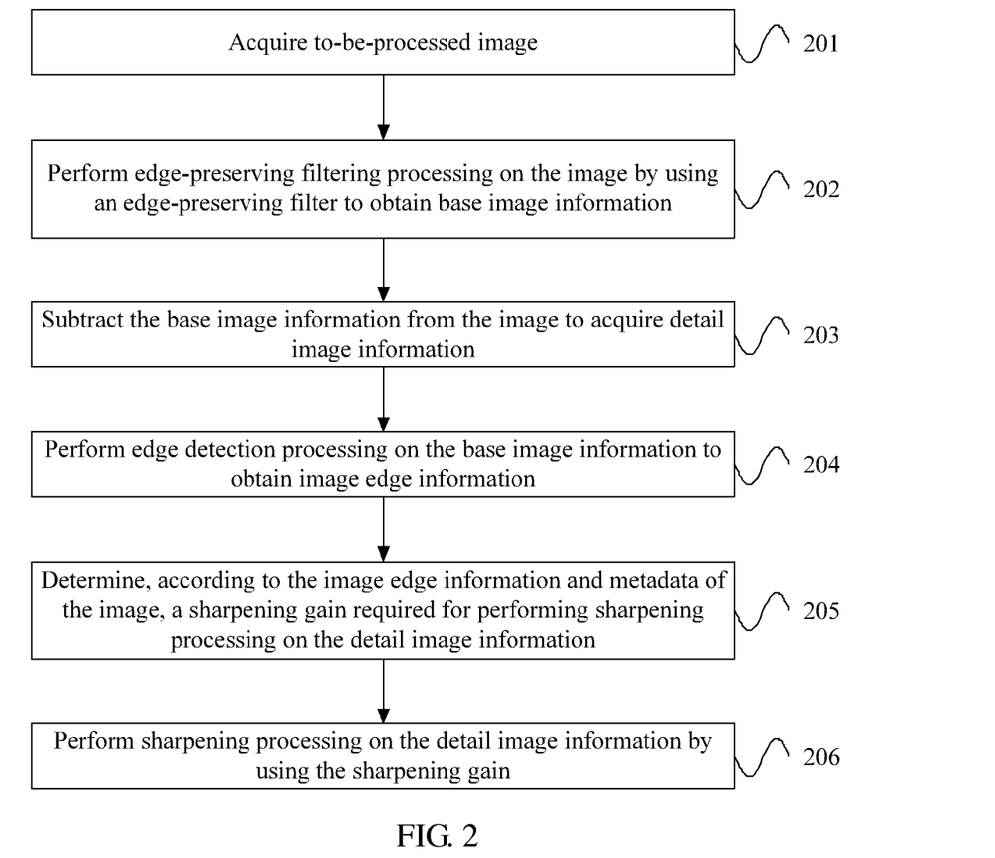
FIG. 2 is a flowchart of a second embodiment of an image sharpening processing method according to the present invention.

FIG. 2 is a flowchart of a second embodiment of an image sharpening processing method according to the present invention. As shown in FIG. 2, this embodiment can be implemented using an image sharpening processing apparatus, and the apparatus, may be integrated into a shooting terminal to implement the method in this embodiment. The method in this embodiment may include the following steps.

Step 201: Acquire to-be-processed image information.

Step 202: Perform edge-preserving filtering processing on the image information using an edge-preserving filter to obtain base image information.

In this embodiment, after the to-be-processed image information is acquired, the to-be-processed image information may be image information that is not processed using an image processing algorithm. Edge-preserving filtering processing is performed on the to-be-processed image information using the edge-preserving filter to obtain the base image information, where the base image information may be low-frequency image information, and the base image information includes image edge information. It should be noted that, edge-preserving filtering processing performed on the image information using the edge-preserving filter is consistent with that in the prior art, and details are not repeatedly described herein in this embodiment. Because the to-be-processed image information is formed by multiple pixels, the base image information obtained is base image information of pixels.

Step 203: Subtract the base image information from the image information to acquire detail image information.

In this embodiment, after the base image information is acquired using the filter-preserving filter, the base image information is subtracted from the to-be-processed image information, so as to acquire the detail image information, where the detail image information excludes the image edge information, is high-frequency image information, and is detail image information of pixels.

Step 204: Perform edge detection processing on the base image information to obtain image edge information.

In this embodiment, after the base image information is acquired using the filter-preserving filter, edge detection processing is performed on the base image information, so as to acquire the image edge information from the base image information. It should be noted that, edge detection processing performed on the base image information is consistent with that in the prior art, and details are not repeatedly described herein in this embodiment. In addition, the image edge information is edge information of pixels, and the edge information of each pixel corresponds to the detail image information of the corresponding pixel.

Step 205: Determine, according to the image edge information and metadata of the image information, a sharpening gain required for performing sharpening processing on the detail image information.

In this embodiment, the sharpening gain required for performing sharpening processing on the detail image information is determined according to the image edge information and the metadata of the image information. Noise in the to-be-processed image information is retained in the high-frequency detail image information. Therefore, the image edge information and the noise can be separated, and the image edge information is not interfered by the noise, and the image edge information obtained in this way has a relatively good amplitude. If an amplitude in image edge information of a pixel is excessively low, it indicates that the pixel has little edge information, and it is a flat area in the image, and there is a high possibility that noise exists in the flat area. Therefore, to suppress noise amplification, the sharpening gain required for performing sharpening processing on the detail image information of the pixel should be less. If an amplitude in image edge information of a pixel is excessively high, it indicates that the pixel has much edge information, and to avoid generating a phenomenon of overshoot, the sharpening gain required for performing sharpening processing on the detail image information of the pixel should be less. If an amplitude in image edge information of a pixel is in the middle of a value range, because image quality is closely related to the shooting environment at the time, a sharpening gain corresponding to metadata of the image information can be selected according to the metadata when the image is shot, so as to perform sharpening processing on the detail image information, thereby implementing sharpening processing on the detail image information of the pixel according to the environmental information when the to-be-processed image information is shot, and improving image quality.

In specific implementation, the metadata of the image information includes light sensitivity and exposure time when the image information is shot. Therefore, a correspondence between the light sensitivity and the exposure time of the image information and a sharpness algorithm parameter group may be predetermined, and the corresponding sharpness algorithm parameter group may be determined according to the light sensitivity and the exposure time of the image information, where the sharpness algorithm parameter group includes a maximum value of the sharpening gain of the image information, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of the maximum value and the minimum value, where the first amplitude is less than the second amplitude. Then, the sharpening gain required for performing sharpening processing on the detail image information is determined according to the image edge information and sharpness algorithm parameter group.

Further, after the sharpness algorithm parameter group is acquired according to the light sensitivity and the exposure time of the image information, the sharpening gain Sharpmap required for performing sharpening processing on the detail image information is obtained by calculation performed using formula (1):

$$Sharpmap = \frac{(Peak - Low)(edgInfo)^{2 \times order1}}{(cutoff1)^{2 \times order1} + (edgInfo)^{2 \times order1}} \times \frac{(cutoff2)^{2 \times order2}}{(cutoff2)^{2 \times order2} + (edgInfo)^{2 \times order2}} + Low, \quad (1)$$

where edgInfo is the amplitude of the image edge information, Peak is the maximum value of the sharpening gain, Low is the minimum value of the sharpening gain, order1 is the first gradient of the sharpening gain increasing from the minimum value to the maximum value along with the increase of the amplitude, order2 is the second gradient of the sharpening gain decreasing from the maximum value to the minimum value along with the increase of the amplitude, Cutoff1 is the first amplitude of the image edge information when the sharpening gain is half of the maximum value and the minimum value (namely, (Peak+Low)/2), Cutoff2 is the second amplitude of the image edge information when the sharpening gain is half of the maximum value and the minimum value (namely, (Peak+Low)/2), and Peak, Low, order1, order2, Cutoff1, and Cutoff2 are parameters in the sharpness algorithm parameter group.

Figure 3:
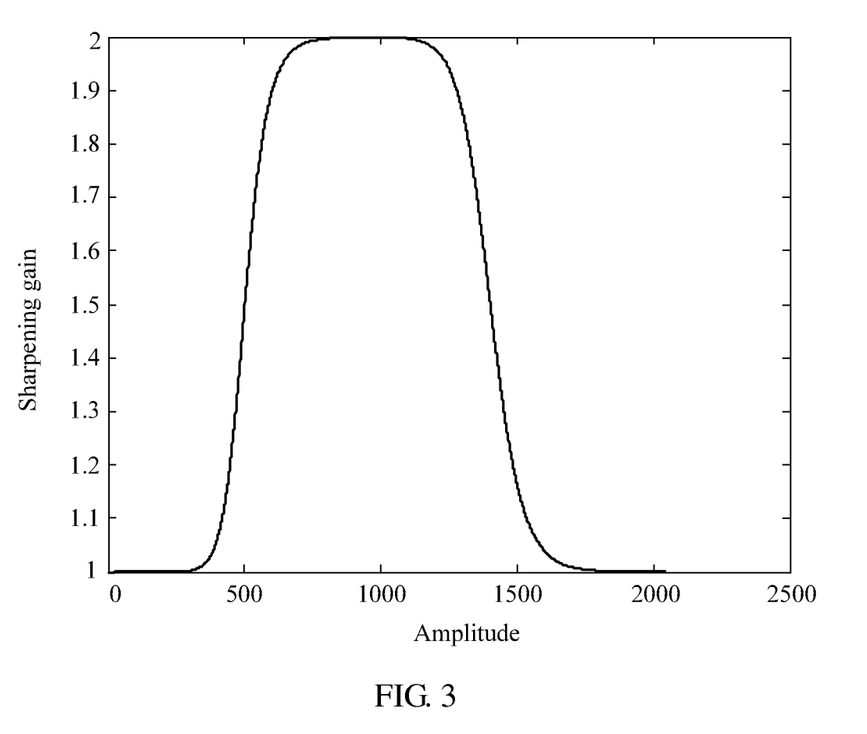
FIG. 3 is a schematic diagram of a sharpening gain related to an amplitude of image edge information in FIG. 2.

Because edgInfo is an amplitude of image edge information of each pixel, amplitudes may be different values, and corresponding sharpening gains obtained using formula (1) are also different values, a sharpening gain curve related to amplitudes of the image edge information may be obtained using formula (1), as shown in FIG. 3. It can be learned from FIG. 3 that, an amplitude of image edge information of a pixel is excessively high or excessively low, a determined sharpening gain is approximately 1. Therefore, no sharpening processing is performed or little sharpening processing is performed on the detail image information of the pixels, so as to suppress noise amplification and avoid generating a phenomenon of overshoot; whereas when the amplitude of the image edge information of the pixel is in the middle of the value range, the determined sharpening gain is a value greater than 1. Therefore, sharpening processing is performed on the detail image information of these pixels to improve image quality. It can be learned that, the sharpening gain corresponding to each pixel may be determined using the amplitude of the image edge information of each pixel shown in FIG. 3, and then sharpening processing is performed on the detail image information of the corresponding pixel using the determined sharpening gain. It should be noted that, the value of the sharpening gain and the amplitude of the image edge information shown in FIG. 3 are used as an example for description, where this embodiment is not limited thereto.

Step 206: Perform sharpening processing on the detail image information using the sharpening gain.

In this embodiment, the sharpening gain of each pixel may be obtained in step 205, and then sharpening processing is performed on the detail image information of the corresponding pixel using the sharpening gain of each pixel, so as to obtain the sharpened detail image information. It should be noted that, sharpening processing performed on the detail image information using the sharpening gain is consistent with that in the prior art, and details are not repeatedly described herein in this embodiment. Further, summation is performed on the base image information and the sharpened detail image information, that is, synthesis is performed on the base image information and the sharpened detail image information to obtain the sharpened image information.

Using the image sharpening processing method provided in the second embodiment of the present invention, edge-preserving filtering processing is performed on image information, so that image edge information can be preserved in base image information and further that a sharpening gain required for performing sharpening processing on detail image information is determined according to the image edge information and metadata of the image information. Therefore, in a process of performing sharpening processing on the detail image information using the sharpening gain, noise amplification is suppressed and a phenomenon of overshoot is avoided for the sharpened image information, and meanwhile sharpening processing may be performed on the image information according to the shooting environment, thereby improving quality of a sharpened image.

Figure 4:
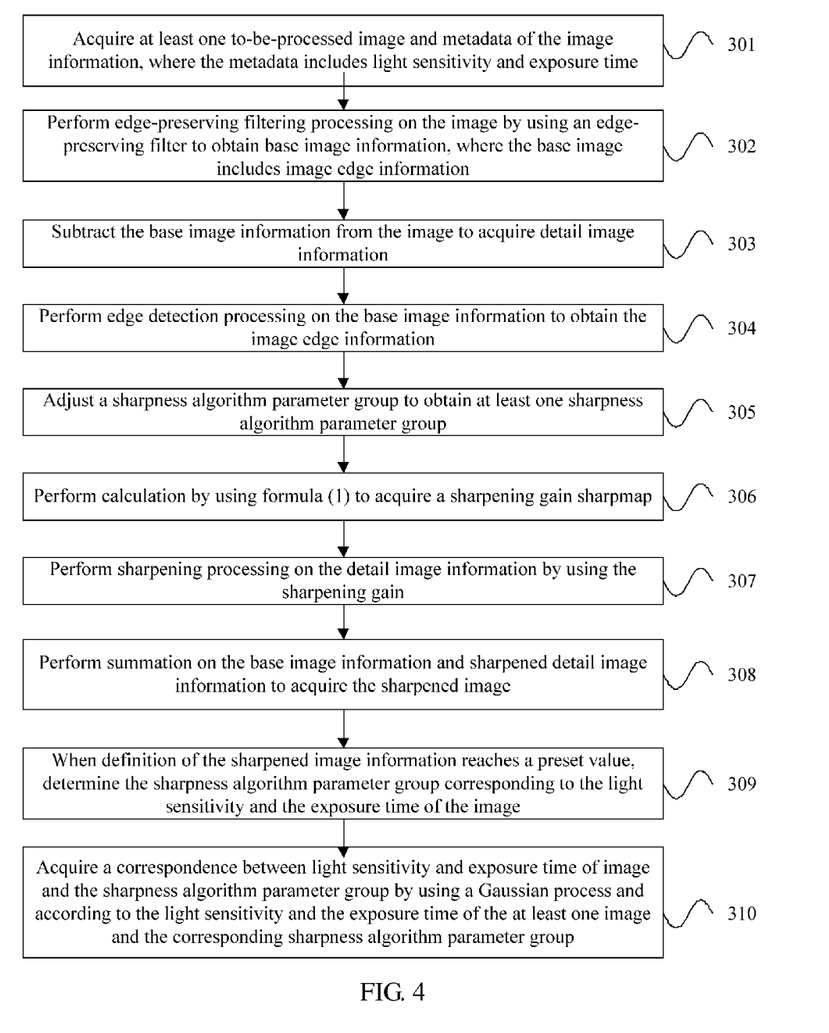
FIG. 4 is a flowchart of determining a correspondence between light sensitivity and exposure time of image information and a sharpness algorithm parameter group in FIG. 2.

The following describes in detail how to determine the correspondence between the light sensitivity and the exposure time of the image information and the sharpness algorithm parameter group. FIG. 4 is a flowchart of determining the correspondence between the light sensitivity and the exposure time of the image information and the sharpness algorithm parameter group in FIG. 2. As shown in FIG. 4, the method for determining the correspondence may include the following steps.

Step 301: Acquire at least one to-be-processed image information and metadata of the image information, where the metadata includes light sensitivity and exposure time;

In this embodiment, at least one to-be-processed image information and metadata when each to-be-processed image information is shot are acquired, where the metadata may include light sensitivity and exposure time. The to-be-processed image information may be image information shot by a shooting terminal, where the shooting terminal may be a device having a shooting lens, such as a mobile phone, a PAD, a notebook computer or a multi-functional player, and the metadata may be the light sensitivity and the exposure time generated when the image information is shot by the shooting terminal.

Step 302: Perform edge-preserving filtering processing on the image information using an edge-preserving filter to obtain base image information, where the base image information includes image edge information.

In this embodiment, after the at least one to-be-processed image information is acquired, edge-preserving filtering processing is performed on each to-be-processed image information using an edge-preserving filter to obtain respective base image information, where each base image information includes image edge information. It should be noted that, edge-preserving filtering processing performed on the image information using the edge-preserving filter is consistent with that in the prior art, and details are not repeatedly described herein in this embodiment. Because the to-be-processed image information is formed by multiple pixels, the base image information obtained is base image information of pixels.

Step 303: Subtract the base image information from the image information to acquire detail image information.

In this embodiment, after the respective base image information is acquired using the filter-preserving filter, the corresponding base image information is subtracted from each to-be-processed image information is performed, so as to acquire respective detail image information, where the detail image information excludes the image edge information, is high-frequency image information, and is detail image information of pixels.

Step 304: Perform edge detection processing on the base image information to obtain the image edge information.

In this embodiment, after the base image information is acquired using the filter-preserving filter, edge detection processing is performed on the respective base image information, so as to acquire the respective image edge information from the respective base image information. It should be noted that, edge detection processing performed on the base image information is consistent with that in the prior art, and details are not repeatedly described herein in this embodiment. In addition, the image edge information is edge information of pixels, and the edge information of each pixel corresponds to the detail image information of the corresponding pixel.

Step 305: Adjust the sharpness algorithm parameter group to obtain at least one sharpness algorithm parameter group.

In this embodiment, the sharpness algorithm parameter group may include a maximum value of a sharpening gain of the image information, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of the maximum value and the minimum value, where the first amplitude is less than the second amplitude. Therefore, for each to-be-processed image information, the sharpness algorithm parameter group is adjusted to obtain at least one sharpness algorithm parameter group.

Step 306: Perform calculation using formula (1) to acquire a sharpening gain Sharpmap.

In this embodiment, for each to-be-processed image information, after the at least one sharpness algorithm parameter group is obtained, the sharpening gain Sharpmap required for performing sharpening processing on the detail image information is acquired by calculation performed using formula (1):

$$Sharpmap = \frac{(\text{Peak} - \text{Low})(edgInfo)^{2\times order1}}{(cutoff1)^{2\times order1} + (edgInfo)^{2\times order1}} \times \qquad (1)$$

$$\frac{(cutoff2)^{2\times order2}}{(cutoff2)^{2\times order2} + (edgInfo)^{2\times order2}} + \text{Low},$$

where edgInfo is an amplitude of the image edge information, Peak is a maximum value of the sharpening gain, Low is a minimum value of the sharpening gain, order1 is the first gradient of the sharpening gain increasing from the minimum value to the maximum value along with the increase of the amplitude, order2 is the second gradient of the sharpening gain decreasing from the maximum value to the minimum value along with the increase of the amplitude, Cutoff1 is a first amplitude of the image edge information when the sharpening gain is half of the maximum value and the minimum value (namely, (Peak+Low)/2), Cutoff2 is a second amplitude of the image edge information when the sharpening gain is half of the maximum value and the minimum value (namely, (Peak+Low)/2), and Peak, Low, order1, order2, Cutoff1, and Cutoff2 are parameters in the sharpness algorithm parameter group.

Because edgInfo is an amplitude of image edge information of each pixel, amplitudes may be different values, and corresponding sharpening gains obtained using formula (1) are also different values, a sharpening gain curve related to amplitudes of the image edge information may be obtained using formula (1), as shown in FIG. 3. Therefore, for each to-be-processed image information, at least one group of sharpening gains related to the amplitudes of the image edge information may be obtained using at least one sharpness algorithm parameter group and formula (1).

Step 307: Perform sharpening processing on the detail image information using the sharpening gain.

In this embodiment, at least one group of sharpening gains of pixels may be obtained in step 306, and then sharpening processing is performed on the detail image information of the corresponding pixel using the sharpening gain of each pixel, so as to obtain at least one the sharpened detail image information. It should be noted that, sharpening processing performed on the detail image information using the sharpening gain is consistent with that in the prior art, and details are not repeatedly described herein in this embodiment.

Step 308: Perform summation on the base image information and the sharpened detail image information to acquire the sharpened image information.

In this embodiment, for each to-be-processed image information, summation is performed on the base image information and at least one corresponding sharpened detail image information, that is, synthesis is performed on the base image information and the sharpened detail image information, so as to obtain at least one sharpened image information.

Step 309: When definition of the sharpened image information reaches a preset value, determine a sharpness algorithm parameter group corresponding to the light sensitivity and the exposure time of the image information.

In this embodiment, for each to-be-processed image information, whether definition of at least one sharpened image information reaches a preset value is determined. If it is determined that the definition of the sharpened image information reaches the preset value, it indicates that a sharpened image has good effect, the sharpness algorithm parameter group selected for the sharpening processing is determined, and the sharpness algorithm parameter group is marked as corresponding to the light sensitivity and the exposure time of the image information; and if it is determined that the definition of the sharpened image information does not reach the preset value, it indicates that the sharpened image has bad effect, and it indicates that the sharpness algorithm parameter group selected for the sharpening processing is inappropriate. It should be noted that, the foregoing preset value is determined according to an application scenario and image information, which is not limited herein in this embodiment. An optimal sharpness algorithm parameter group corresponding to the light sensitivity and the exposure time of the image information may be selected using the preset value. Therefore, for each to-be-processed image information, a sharpness algorithm parameter group corresponding to the light sensitivity and the exposure time of the image information can all be determined, so as to determine the light sensitivity and the exposure time of at least one image information and the sharpness algorithm parameter group corresponding to the light sensitivity and exposure time.

Step 310: Acquire the correspondence between the light sensitivity and the exposure time of the image information and the sharpness algorithm parameter group using a Gaussian process and according to the light sensitivity and the exposure time of the at least one image information and the corresponding sharpness algorithm parameter group.

In this embodiment, after the light sensitivity and the exposure time of the at least one image information and the sharpness algorithm parameter group corresponding to the light sensitivity and exposure time are determined, the correspondence between the light sensitivity and the exposure time of the image information and the sharpness algorithm parameter group may be acquired using the Gaussian process, that is, a function relationship F between the light sensitivity and the exposure time of the image information and the sharpness algorithm parameter group may be established using a Gaussian process method, namely, sharpness parameter group=F (light sensitivity and exposure time). It should be noted that, the Gaussian process method is consistent with that in the prior art, and details are not repeatedly described herein in this embodiment.

In this embodiment, a correspondence between light sensitivity and exposure time and a sharpness algorithm parameter group is established using light sensitivity and exposure time of image information and a corresponding optimal sharpness algorithm parameter. Then, a sharpness parameter group corresponding to any one light sensitivity and exposure time may be acquired according to the correspondence between the light sensitivity and exposure time and the sharpness algorithm parameter. Then, a sharpening gain Sharpmap is calculated using formula (1), thereby implementing that sharpening processing may be performed according to the shooting environment of each image information at the time and that image processing quality can be improved in various complex shooting environments.

Figure 5:
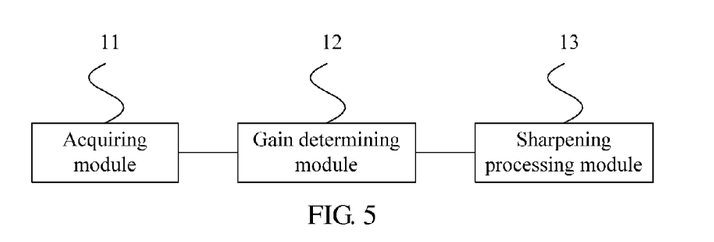
FIG. 5 is a schematic structural diagram of a first embodiment of an image sharpening processing apparatus according to the present invention.

FIG. 5 is a schematic structural diagram of a first embodiment of an image sharpening processing apparatus according to the present invention. As shown in FIG. 5, the apparatus in this embodiment may include an acquiring module 11, a gain determining module 12, and a sharpening processing module 13, where the acquiring module 11 is configured to acquire to-be-processed image information, and perform edge-preserving filtering processing on the image information to obtain base image information and detail image information, where the base image information includes image edge information; the gain determining module 12 is configured to determine, according to the image edge information, a sharpening gain required for performing sharpening processing on the detail image information; and the sharpening processing module 13 is configured to perform sharpening processing on the detail image information using the sharpening gain.

For a detailed interaction process among the foregoing modules, refer to descriptions of the method embodiments, and therefore details are not repeated herein.

The apparatus provided in this embodiment may be configured to execute the technical solution in the method embodiment shown in FIG. 1, and their implementation principles and technical effect are similar. For details, refer to the related description in the foregoing embodiments, and details are not repeatedly described herein.

Figure 6:
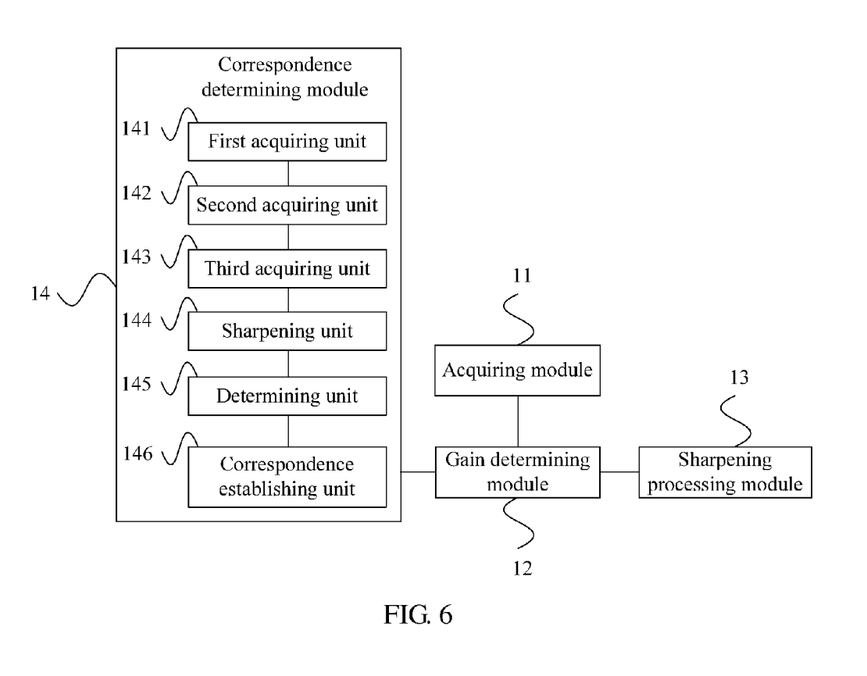
FIG. 6 is a schematic structural diagram of a second embodiment of an image sharpening processing apparatus according to the present invention.

FIG. 6 is a schematic structural diagram of a second embodiment of an image sharpening processing apparatus according to the present invention. As shown in FIG. 6, on a basis of a structure of the apparatus shown in FIG. 5, the apparatus in this embodiment may further include a correspondence determining module 14. The acquiring module 11 is further configured to, before the gain determining module 12 determines, according to the image edge information, the sharpening gain required for performing sharpening processing on the detail image information, perform edge detection processing on the base image information to obtain the image edge information.

Further, the acquiring module 11 is configured to perform edge-preserving filtering processing on the image information using an edge-preserving filter to obtain the base image information; and subtract the base image information from the image information to acquire the detail image information. The gain determining module 12 is configured to determine, according to the image edge information and metadata of the image information, the sharpening gain required for performing sharpening processing on the detail image information.

Further, the gain determining module 12 is configured to determine a sharpness algorithm parameter group according to light sensitivity and exposure time of the image information, where the sharpness algorithm parameter group includes a maximum value of the sharpening gain of the image information, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of the maximum value and the minimum value, where the first amplitude is less than the second amplitude; and determine, according to the image edge information and the sharpness algorithm parameter group, the sharpening gain required for performing sharpening processing on the detail image information.

In a possible implantation manner, the gain determining module 12 is configured to perform calculation using formula (1) to acquire a sharpening gain Sharpmap:

$$Sharpmap = \frac{(Peak - Low)(edgInfo)^{2 \times order1}}{(cutoff1)^{2 \times order1} + (edgInfo)^{2 \times order1}} \times \qquad (1)$$

$$\frac{(cutoff2)^{2 \times order2}}{(cutoff2)^{2 \times order2} + (edgInfo)^{2 \times order2}} + Low,$$

where edgInfo is the amplitude of the image edge information, Peak is the maximum value of the sharpening gain, Low is the minimum value of the sharpening gain, order1 is the first gradient of the sharpening gain increasing from the minimum value to the maximum value along with the increase of the amplitude, order2 is the second gradient of the sharpening gain decreasing from the maximum value to the minimum value along with the increase of the amplitude, Cutoff1 is the first amplitude of the image edge information when the sharpening gain is half of the maximum value and the minimum value, and Cutoff2 is the second amplitude of the image edge information when the sharpening gain is half of the maximum value and the minimum value.

The correspondence determining module 14 is configured to determine a correspondence between the light sensitivity and the exposure time of the image information and the sharpness algorithm parameter group before the gain determining module 12 determines the sharpness algorithm parameter group according to the light sensitivity and the exposure time of the image information.

Further, the correspondence determining module 14 includes a first acquiring unit 141, a seconding acquiring unit 142, a third acquiring unit 143, a sharpening unit 144, a determining unit 145, and a correspondence establishing unit 146, where the first acquiring unit 141 is configured to acquire at least one to-be-processed image information and metadata of the image information, where the metadata includes light sensitivity and exposure time; the second acquiring unit 142 is configured to perform edge-preserving filtering processing on the image information using an edge-preserving filter to obtain base image information, where the base image information includes image edge information; subtract the base image information from the image information to acquire the detail image information, and perform edge detection processing on the base image information to obtain the image edge information; and the third acquiring unit 143 is configured to adjust the sharpness algorithm parameter group to obtain at least one sharpness algorithm parameter group; and perform calculation using formula (1) to acquire a sharpening gain Sharpmap:

$$Sharpmap = \frac{(Peak - Low)(edgInfo)^{2 \times order1}}{(cutoff1)^{2 \times order1} + (edgInfo)^{2 \times order1}} \times \qquad (1)$$

$$\frac{(cutoff2)^{2 \times order2}}{(cutoff2)^{2 \times order2} + (edgInfo)^{2 \times order2}} + Low,$$

where edgInfo is an amplitude of the image edge information, Peak is a maximum value of the sharpening gain, Low is a minimum value of the sharpening gain, order1 is a first gradient of the sharpening gain increasing from the minimum value to the maximum value along with an increase of an amplitude, order2 is a second gradient of the sharpening gain decreasing from the maximum value to the minimum value along with the increase of the amplitude, Cutoff1 is a first amplitude of the image edge information when the sharpening gain is half of the maximum value and the minimum value, and Cutoff2 is a second amplitude of the image edge information when the sharpening gain is half of the maximum value and the minimum value. The sharpening unit 144 is configured to perform sharpening processing on the detail image information using the sharpening gain. The determining unit 145 is configured to perform summation on the base image information and the sharpened detail image information to acquire the sharpened image information; and when definition of the sharpened image reaches a preset value, determine a sharpness algorithm parameter group corresponding to the light sensitivity and the exposure time of the image information. The correspondence establishing unit 146 is configured to acquire the correspondence between the light sensitivity and the exposure time of the image information and the sharpness algorithm parameter group using a Gaussian process and according to the light sensitivity and exposure time of the at least one image information and the corresponding sharpness algorithm parameter group.

For a detailed interaction process among the foregoing modules, refer to descriptions of the method embodiments, and therefore details are not repeated herein.

The apparatus provided in this embodiment may be configured to execute the technical solution in the method embodiment shown in FIG. 2, and their implementation principles and technical effect are similar. For details, refer to the related description in the foregoing embodiments, and details are not repeatedly described herein.

Figure 7:
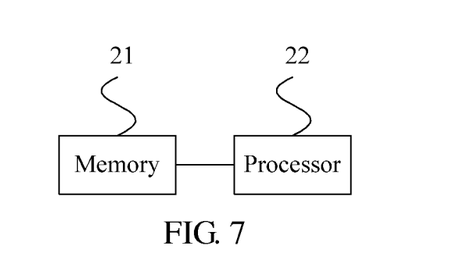
FIG. 7 is a schematic structural diagram of a third embodiment of an image sharpening processing apparatus according to the present invention.

FIG. 7 is a schematic structural diagram of a third embodiment of an image sharpening processing apparatus according to the present invention. As shown in FIG. 7, the apparatus in this embodiment includes a memory 21 and a processor 22 connected to the memory 21, where the memory 21 stores a set of program code, and the memory 21 may include a non-volatile memory. The processor 22 may be a central processing unit (CPU) or an application-specific integrated circuit (ASIC), or may be configured as one or multiple integrated circuits for implementing the embodiments of the present invention. The processor 22 is configured to invoke the program code stored in the memory 21 to execute the following operations: acquiring to-be-processed image information; performing edge-preserving filtering processing on the image information to obtain base image information and detail image information, where the base image information includes image edge information; determining, according to the image edge information, a sharpening gain required for performing sharpening processing on the detail image information; and performing sharpening processing on the detail image information using the sharpening gain.

Further, before the determining, according to the image edge information, a sharpening gain required for performing sharpening processing on the detail image information, the operations include performing edge detection processing on the base image information to obtain the image edge information.

Further, the performing edge-preserving filtering processing on the image information to obtain base image information and detail image information includes performing edge-preserving filtering processing on the image information using an edge-preserving filter to obtain the base image information; and subtracting the base image information from the image information to acquire the detail image information.

Optionally, the determining, according to the image edge information, a sharpening gain required for performing sharpening processing on the detail image information includes determining, according to the image edge information and metadata of the image information, the sharpening gain required for performing sharpening processing on the detail image information.

Further, the determining, according to the image edge information and metadata of the image information, the sharpening gain required for performing sharpening processing on the detail image information includes determining a sharpness algorithm parameter group according to light sensitivity and exposure time of the image information, where the sharpness algorithm parameter group includes a maximum value of the sharpening gain of the image information, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of the maximum value and the minimum value, where the first amplitude is less than the second amplitude; and determining, according to the image edge information and sharpness algorithm parameter group, the sharpening gain required for performing sharpening processing on the detail image information.

Further, the determining, according to the image edge information and sharpness algorithm parameter group, the sharpening gain required for performing sharpening processing on the detail image information includes performing calculation using formula (1) to acquire the sharpening gain Sharpmap:

$$Sharpmap = \frac{(\text{Peak} - \text{Low})(edgInfo)^{2 \times order1}}{(cutoff1)^{2 \times order1} + (edgInfo)^{2 \times order1}} \times \frac{(cutoff2)^{2 \times order2}}{(cutoff2)^{2 \times order2} + (edgInfo)^{2 \times order2}} + \text{Low}, \quad (1)$$

where edgInfo is the amplitude of the image edge information, Peak is the maximum value of the sharpening gain, Low is the minimum value of the sharpening gain, order1 is the first gradient of the sharpening gain increasing from the minimum value to the maximum value along with the increase of the amplitude, order2 is the second gradient of the sharpening gain decreasing from the maximum value to the minimum value along with the increase of the amplitude, Cutoff1 is the first amplitude of the image edge information when the sharpening gain is half of the maximum value and the minimum value, and Cutoff2 is the second amplitude of the image edge information when the sharpening gain is half of the maximum value and the minimum value.

Optionally, before the determining a sharpness algorithm parameter group according to light sensitivity and exposure time of the image information, the operations further include determining a correspondence between the light sensitivity and the exposure time of the image information and the sharpness algorithm parameter group.

Further, the determining a correspondence between the light sensitivity and the exposure time of the image information and the sharpness algorithm parameter group includes acquiring at least one to-be-processed image information and metadata of the image information, where the metadata includes light sensitivity and exposure time; performing edge-preserving filtering processing on the image information using an edge-preserving filter to obtain the base image information, where the base image information includes the image edge information; subtracting the base image information from the image information to acquire the detail image information; performing edge detection processing on the base image information to obtain the image edge information; adjusting the sharpness algorithm parameter group to obtain at least one sharpness algorithm parameter group; performing calculation using formula (1) to acquire a sharpening gain Sharpmap:

$$Sharpmap = \frac{(\text{Peak} - \text{Low})(edgInfo)^{2 \times order1}}{(cutoff1)^{2 \times order1} + (edgInfo)^{2 \times order1}} \times \quad (1)$$

-continued $$\frac{(cutoff2)^{2\times order2}}{(cutoff2)^{2\times order2}+(edgInfo)^{2\times order2}}+\text{Low},$$

where edgInfo is an amplitude of the image edge information, Peak is a maximum value of the sharpening gain, Low is a minimum value of the sharpening gain, order1 is a first gradient of the sharpening gain increasing from the minimum value to the maximum value along with an increase of an amplitude, order2 is a second gradient of the sharpening gain decreasing from the maximum value to the minimum value along with the increase of the amplitude, Cutoff1 is a first amplitude of the image edge information when the sharpening gain is half of the maximum value and the minimum value, and Cutoff2 is a second amplitude of the image edge information when the sharpening gain is half of the maximum value and the minimum value; performing sharpening processing on the detail image information using the sharpening gain; performing summation on the base image information and the sharpened detail image information to acquire the sharpened image information; when definition of the sharpened image reaches a preset value, determining a sharpness algorithm parameter group corresponding to the light sensitivity and the exposure time of the image information; and acquiring the correspondence between the light sensitivity and the exposure time of the image information and the sharpness algorithm parameter group using a Gaussian process and according to the light sensitivity and the exposure time of the at least one image information and the corresponding sharpness algorithm parameter group.

It should be noted that, for a technical solution that is implemented by the processor 22 by invoking the program code stored in the memory 21, refer to the embodiments of the image sharpening processing method shown in FIG. 1 and FIG. 2 in the present invention, and their implementation principles and technical effect are similar. For details, refer to the related description in the foregoing embodiments, and details are not repeatedly described herein.

Figure 8:
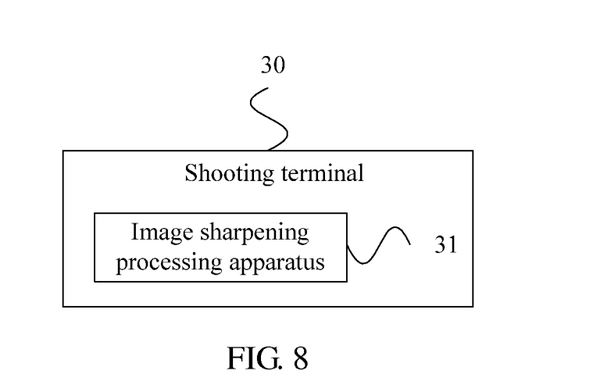
FIG. 8 is a schematic structural diagram of a first embodiment of a shooting terminal according to the present invention.

FIG. 8 is a schematic structural diagram of a first embodiment of a shooting terminal according to the present invention. As shown in FIG. 8, a shooting terminal 30 in this embodiment may include an image sharpening processing apparatus 31, where the image sharpening processing apparatus 31 may use a structure in any one of the embodiments of the image sharpening processing apparatus shown in FIG. 5 to FIG. 7, and can execute technical solutions of any one of the embodiments shown in FIG. 1 or FIG. 2 correspondingly. Their implementation principles and technical effects are similar. For details, refer to the related description in the foregoing embodiments, and details are not repeatedly described herein.

The shooting terminal 30 may be a mobile phone or a tablet computer, and may also be a device having a shooting lens, such as a notebook computer or a multi-functional player.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An image sharpening processing method, comprising;
performing edge-preserving filtering processing on an image to obtain base image information and detail image information;
performing edge detection processing on the base image information to obtain image edge information; and
performing sharpening processing on the detail image information using a sharpening gain determined according to the image edge information.

2. The method according to claim 1, further comprising performing summation on the base image information and the detail image information sharpened to acquire a sharpened image.

3. The method according to claim 2, wherein performing edge-preserving filtering processing on the image comprises:
performing edge-preserving filtering processing on the image using an edge-preserving filter to obtain the base image information; and
subtracting the base image information from the image to acquire the detail image information.

4. The method according to claim 2, wherein the sharpening gain is determined according to the image edge information and metadata of the image.

5. The method according to claim 2, wherein the sharpening gain is determined by:
determining a sharpness algorithm parameter group according to light sensitivity and exposure time of metadata of the image, wherein the sharpness algorithm parameter group comprises a maximum value of the sharpening gain of the image, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of a sum of the maximum value and the minimum value, and wherein the first amplitude is less than the second amplitude; and
determining the sharpening gain according to the image edge information and the sharpness algorithm parameter group.

6. The method according to claim 5, wherein a sharpmap of the sharpening gain is determined in accordance with the following formula (1):

$$Sharpmap = \frac{(\text{Peak}-\text{Low})(edgInfo)^{2\times order1}}{(cutoff1)^{2\times order1}+(edgInfo)^{2\times order1}} \times \qquad (1)$$

$$\frac{(cutoff2)^{2\times order2}}{(cutoff2)^{2\times order2}+(edgInfo)^{2\times order2}}+\text{Low}$$

wherein edgInfo is the amplitude of the image edge information, wherein Peak is the maximum value of the sharpening gain, wherein Low is the minimum value of the sharpening gain, wherein order1 is the first gradient of the sharpening gain increasing from the minimum value to the maximum value along with the increase of the amplitude, wherein order2 is the second gradient of the sharpening gain decreasing from the maximum value to the minimum value along with the increase of the amplitude, wherein Cutoff1 is the first amplitude of the image edge information when the sharpening gain is half of the maximum value and the minimum value, and wherein Cutoff2 is the second amplitude of the image edge information when the sharpening gain is half of the maximum value and the minimum value.

7. The method according to claim 5, further comprising determining a correspondence between the light sensitivity and the exposure time of the metadata and the sharpness algorithm parameter group.

8. The method according to claim 7, wherein determining the correspondence between the light sensitivity and the exposure time of the metadata and the sharpness algorithm parameter group comprises:
    determining the sharpness algorithm parameter group corresponding to the light sensitivity and the exposure time of the metadata when definition of the sharpened image reaches a preset value; and
    acquiring the correspondence between the light sensitivity and the exposure time of the metadata and the sharpness algorithm parameter group using a Gaussian process.

9. An image sharpening apparatus, comprising:
    a processor; and
    a memory storing instructions, which when executed by the processor, cause the apparatus to:
        perform edge-preserving filtering processing on an image to obtain base image information and detail image information;
        perform edge detection processing on the base image information to obtain image edge information; and
        perform sharpening processing on the detail image information using a sharpening gain determined according to the image edge information.

10. The apparatus according to claim 9, wherein the instructions further cause the apparatus to perform summation on the base image information and the detail image information sharpened to acquire a sharpened image.

11. The apparatus according to claim 10, wherein the instructions causing the apparatus to perform edge-preserving filtering processing on the image comprise instructions causing the apparatus to:
    perform edge-preserving filtering processing on the image using an edge-preserving filter to obtain the base image information; and
    subtract the base image information from the image to acquire the detail image information.

12. The apparatus according to claim 10, wherein the sharpening gain is determined according to the image edge information and metadata of the image.

13. The apparatus according to claim 10, wherein the sharpening gain is determined by:
    determining a sharpness algorithm parameter group according to light sensitivity and exposure time of metadata of the image, wherein the sharpness algorithm parameter group comprises a maximum value of the sharpening gain of the image, a minimum value of the sharpening gain, a first gradient of the sharpening gain increasing from the minimum value to the maximum value along with an increase of an amplitude of the image edge information, a second gradient of the sharpening gain decreasing from the maximum value to the minimum value along with the increase of the amplitude, and a first amplitude and a second amplitude of the image edge information when the sharpening gain is half of a sum of the maximum value and the minimum value, and the first amplitude is less than the second amplitude; and
    determining the sharpening gain according to the image edge information and the sharpness algorithm parameter group.

14. The apparatus according to claim 13, wherein a sharpmap of the sharpening gain is determined in accordance with the following formula (1):

$$Sharpmap = \frac{(\text{Peak} - \text{Low})(edgInfo)^{2 \times order1}}{(cutoff1)^{2 \times order1} + (edgInfo)^{2 \times order1}} \times \frac{(cutoff2)^{2 \times order2}}{(cutoff2)^{2 \times order2} + (edgInfo)^{2 \times order2}} + \text{Low} \quad (1)$$

wherein edgInfo is the amplitude of the image edge information, wherein Peak is the maximum value of the sharpening gain, wherein Low is the minimum value of the sharpening gain, wherein order1 is the first gradient of the sharpening gain increasing from the minimum value to the maximum value along with the increase of the amplitude, wherein order2 is the second gradient of the sharpening gain decreasing from the maximum value to the minimum value along with the increase of the amplitude, wherein Cutoff1 is the first amplitude of the image edge information when the sharpening gain is half of the maximum value and the minimum value, and wherein Cutoff2 is the second amplitude of the image edge information when the sharpening gain is half of the maximum value and the minimum value.

15. The apparatus according to claim 13, wherein the instructions further cause the apparatus to determine a correspondence between the light sensitivity and the exposure time of the metadata and the sharpness algorithm parameter group.

16. The apparatus according to claim 15, wherein instructions causing the apparatus to determine the correspondence between the light sensitivity and the exposure time of the metadata and the sharpness algorithm parameter group comprise instructions causing the apparatus to:
    determine the sharpness algorithm parameter group corresponding to the light sensitivity and the exposure time of the metadata when definition of the sharpened image reaches a preset value; and
    acquire the correspondence between the light sensitivity and the exposure time of the metadata and the sharpness algorithm parameter group using a Gaussian process.

17. A non-transitory computer readable storage medium having instructions stored therein, which when executed by an apparatus, cause the apparatus to:
    perform edge-preserving filtering processing on an image to obtain base image information and detail image information;
    perform edge detection processing on the base image information to obtain image edge information; and
    perform sharpening processing on the detail image information using a sharpening gain determined according to the image edge information.

18. The non-transitory computer readable storage medium according to claim 17, wherein the instructions further cause the apparatus to perform summation on the base image information and the detail image information sharpened to acquire a sharpened image.

19. The non-transitory computer readable storage medium according to claim 18, wherein the instructions causing the apparatus to perform edge-preserving filtering processing on the image comprise instructions causing the apparatus to:
- perform edge-preserving filtering processing on the image using an edge-preserving filter to obtain the base image information; and
- subtract the base image information from the image to acquire the detail image information.

20. The non-transitory computer readable storage medium according to claim 18, wherein the sharpening gain is determined according to the image edge information and metadata of the image.

\* \* \* \* \*